United States Patent
Englert

(10) Patent No.: US 7,535,572 B2
(45) Date of Patent: May 19, 2009

(54) COMPRESSION ASSEMBLY OF SPATIAL HETERODYNE SPECTROMETER (SHS)

(75) Inventor: Christoph R Englert, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 161 days.

(21) Appl. No.: 11/561,745

(22) Filed: Nov. 20, 2006

(65) Prior Publication Data

US 2007/0159634 A1     Jul. 12, 2007

Related U.S. Application Data

(60) Provisional application No. 60/740,295, filed on Nov. 18, 2005.

(51) Int. Cl.
    *G01J 3/45*    (2006.01)
    *G01B 9/02*    (2006.01)

(52) U.S. Cl. ..................................... 356/451

(58) Field of Classification Search .............. 356/451, 356/456; 250/339.07, 339.09
See application file for complete search history.

(56) References Cited

OTHER PUBLICATIONS

Harlander et al. "Robust monolithic ultraviolet interferometer for the Shimmer instrument on STPSat-1" Applied Optics, vol. 42, No. 15. May 20, 2003. pp. 2829-2834.*

* cited by examiner

*Primary Examiner*—Patrick J Connolly
(74) *Attorney, Agent, or Firm*—John J. Karasek; L. George Legg

(57) ABSTRACT

The present invention provides an economically feasible robust spatial heterodyne spectroscopy (SHS) interferometer. A first type prior art monolithic SHS interferometer is exceedingly expensive, whereas a second type of prior art SHS interferometer is extremely large and has many components, which need to be tuned. The present invention is much less expensive than the first type of prior art SHS interferometer and is much smaller that the second type of prior art SHS interferometer.

4 Claims, 5 Drawing Sheets

COMPRESSION ASSEMBLY OF SPATIAL HETERODYNE SPECTROMETER (SHS)

This Application claims the benefit of U.S. Provisional Application No. 60/740,295, filed Nov. 18, 2005, the entire disclosure of which is incorporated herein by reference.

BACKGROUND

Spatial heterodyne spectroscopy (SHS) was conceived in the late 1980s by Prof. Fred Roesler and his graduate student John Harlander at the University of Wisconsin. SHS interferometers include a beamsplitter two gratings, and two (optional) field-widening prisms. A detailed description of SHS can be found in "Robust monolithic ultraviolet interferometer for the SHIMMER instrument on STPSat-1", *APPLIED OPTICS*, vol. 42, Nol. 15, 20 May 2003, by J. M. Harlander et al. The optical components of SHS interferometers have to be mounted within tight. interferometeric tolerances to achieve high performance. There are generally two types of conventional SHS interferometer configurations, those with discrete optical elements and those with a monolithic optical element.

FIG. 1 illustrates an exemplary convention SHS spectrometer having an interferometer of discrete optical elements. In the figure, the spectrometer 100 includes input optics, an interferometer and output optics. The input optics include an input aperture 102, and collimating lens 104. The interferometer includes a beam splitter 106, prism 108, prism 110, grating 112, and grating 114. The output optics include focusing lens 116, collimating lens 118 and detector 120.

In operation, input light passes through input aperture 102 and diverges to collimating lens 104. Collimated light $\lambda_1$ includes an incident wave front 122. Collimated light $\lambda_1$ is then incident upon beam splitter 106. A first portion of collimated light $\lambda_2$ is reflected toward prism 108, which is then refracted toward grating 112 having a Littrow angle 124. Grating 112 reflects light $\lambda_3$ back though prism 108 and toward beam splitter 106, where light $\lambda_3$ is partially reflected toward lens 104 and partially transmitted toward lens 116. The output optics portion is designed to image the grating planes 112 and 114 onto the detector 120. Here, the partially transmitted light $\lambda_6$ includes a wave front 128 and is focused by lens 116 to a point 134. The light $\lambda_6$ then diverges toward lens 118 to be imaged on detector 120. A second portion $\lambda_4$ of collimated light $\lambda_1$ is transmitted through beam splitter 106 toward prism 110, which is then refracted toward grating 114 having a Littrow angle 126. Grating 114 reflects light $\lambda_5$ back through prism 110 and toward beam splitter 106, where light $\lambda_1$ is partially transmitted toward lens 104 and partially reflected toward lens 116. In the output optics portion, the partially reflected light $\lambda_7$ includes a wave front 130 and is focused by lens 116 to a point 134. The light $\lambda_7$ then diverges toward lens 118 to be imaged on detector 120.

Wave front 128 constructively and destructively interferes with wave front 130, such that that image detected by detector 120 is an interference pattern. An example of such an interference pattern is illustrated in FIG. 3. The characteristics of the pattern are based on the wavelength of the light $\lambda_1$ and the angle 132 between wave front 128 and wave front 130. Angle 132 is mainly based on the frequency of the input light $\lambda_1$ and the structure and angle of gratings 112 and 114. Field-widening prisms 110 and 108 are optional, and merely compensate for non-paraxial rays within the interferometer, in order to increase the throughput.

The optical components of interferometer 100 are individually mounted using commercial or custom-made mechanical mounting techniques like lens holders and three-point mounts. Due to the tight tolerances, the holders are typically adjustable, so the interferometer can be aligned after its assembly. In order to build a rugged interferometer, the holding fixtures have to be very stiff and the adjustable optics mounts get complicated. For example, all elements may typically be held individually in adjustable mounts within a steel fixture. The weight of such an interferometer (~7 kg) is dominated by the steel fixture that is necessary to keep the optical components in position. Alternatively a laboratory breadboard interferometer assembly may use commercial fixtures to hold the individual components. This set up is particularly sensitive to vibration since the commercial mounts are not optimized for stiffness. In any event such conventional discrete optical element types of SHS interferometers generally are relatively heavy as a result of the required mounting systems and have very time consuming adjustment procedures.

The conventional discrete optical elements design of SHS is appropriate for laboratory investigations but the inherent lack of ruggedness excludes these designs from virtually all operational applications that are based on platforms like land vehicles, airplanes, unmanned aerial vehicles (UAVs), satellites, or even a handheld device which has to withstand rough environments to be reliable. Moreover, the realignment of a misaligned interferometer is not trivial and requires a trained person and appropriate equipment, thus further hampering the use of this assembly technique for commercial or military devices.

FIG. 2 illustrates a conventional SHS interferometer comprising a monolithic design. FIG. 2 does not include input optics, output optics or a detector as illustrated in FIG. 1. However, one of skill in the art would understand the operation of the configuration illustrated in FIG. 2 Within a spectrometer.

In the figure, an interferometer 200 includes a first leg portion 202, a second leg portion 204 and an optical beam splitter 206 having a half mirror 208 therein. First leg portion 202 includes a reflective grating 210, a spacer 212, a prism 216 and a spacer 214. Similarly, second leg portion 204 includes a reflective grating 218, a spacer 220, a prism 224 and a spacer 222.

In operation, input light 226 passes into beamsplitter 206 and a portion of which, 240, ultimately exits. Specifically, input light 226 is incident upon half mirror 208 and first portion 228 of input light 226 is reflected toward first leg portion 202 and a second portion 232 is transmitted toward second leg portion 204. In a manner similar to the system illustrated in FIG. 1, portion 228 of the input light transmits through prism 216, which is then refracted by an angle toward grating 210. Grating 210 reflects the light back through prism 216 and toward beam splitter 206, where the light is partially reflected at half mirror 208, wherein portion 236 is transmitted to an output face of beamsplitter 206 and wherein portion 240 is reflected to the input face of beamsplitter 206. Similarly, portion 232 of the input light transmits through prism 224, which is then refracted by an angle toward grating 218. Grating 218 reflects the light back through prism 224 and toward beam splitter 206, where the light is partially reflected at half mirror 208, wherein portion 238 is reflected to an output face of beamsplitter 206 and wherein portion 242 is transmitted to the input face of beamsplitter 206. Output 244 is a combination of light portion 236 and light portion 238, which eventually is detected as an interference pattern.

The main difference between the system illustrated in FIG. 1 and the device illustrated in FIG. 2 is that interferometer 200 of FIG. 2 includes spacers 212, 214, 220 and 222, which enables interferometer 200 to be monolithic.

The main driver for a monolithic SHS interferometer is its inherent ruggedness which was lacking in the system of FIG. 1. Spacers 212, 214, 220 and 222 maintain alignment of the remaining optical components. In such a conventional monolithic type device, the optical components are optically contacted with spacers to form a truly monolithic piece of glass. Specifically, spacer 214 is in optical contact with beamsplitter 206 and prism 216, spacer 212 is in optical contact with prism 216 and grating 210, spacer 222 is in optical contact with beamsplitter 206 and prism 224, and spacer 220 is in optical contact with prism 224 and grating 218.

Optical contacting is a method where the interfacing surfaces of two components are polished to extremely high flatness (several nanometers) before they are contacted. The close proximity of the flat surfaces causes the van der Waals forces to form a strong bond between the components without any adhesives. The lack of a layer of adhesive between components is beneficial, mainly because the thickness of the adhesive layers does not have to be controlled during assembly, which simplifies the "self alignment" during the interferometer assembly, which is then provided by the spacers alone. In order to get a strong bond and to avoid stress due to unequal thermal expansion coefficients, the spacers are made from the same material as the optical components.

Unfortunately, as a consequence of the strong bond between the surfaces, a monolithic interferometer cannot easily be disassembled without risking the destruction of the entire interferometer. The monolithic design provides lighter intrinsically aligned interferometers that are insensitive to vibration. However, polishing the interface surfaces to meet the precision and accuracy required for the optical contacting is very labor intensive, since it has to be performed partly by hand. Therefore, this production technique is very expensive and time consuming (over one hundred thousand USD per interferometer). A monolithic interferometer is appropriate e.g. for one of a kind satellite instruments, but again, it is not suitable for wide spread applications in the commercial or military sector due to its high cost.

In summary, the conventional design and assembly techniques for SHS interferometers seriously impede the development of SHS spectrometers for wide spread applications in the commercial or military sector. The main reasons are either the sensitivity to vibration or the prohibitive cost per unit.

What are needed are SHS interferometers that have the ruggedness of a monolithic device, while significantly reducing the cost per unit. These will finally allow the development of commercial and military SHS devices for application areas where SHS is superior to current spectroscopic techniques like Fourier transform spectroscopy or grating spectroscopy.

There is an increased interest in spectroscopy, such as passive remote sensing for multiple purposes like intelligence gathering (monitoring of exhaust fumes), tactical battlefield applications (chemical threat identification), or tagging, tracking and locating.

BRIEF SUMMARY

It is an object of the present invention to overcome the problems associated with conventional SHS interferometers.

The present invention provides a technique that simplifies the production, assembly, and alignment of SHS interferometers, while preserving the robustness achieved by monolithic SHS interferometers.

The present invention provides a way to fabricate rugged SHS interferometers in a faster, more flexible, and much more cost effective way by avoiding optical contacts. Avoiding optical contacts significantly relaxes the surface flatness requirements. The mechanical tolerances are then driven by the optical performance only, which yields especially relaxed tolerances for longer wavelengths, e.g. in the infrared. It also provides the option of using different spacer materials in the interferometer, which allows more flexibility in the temperature compensation of the interferometer if it is needed.

The invention includes a type of SHS interferometer design and assembly technique wherein the optical components, e.g., the beamsplitter, gratings and optional prisms, are separated by properly dimensioned spacers. Further, the alignment of the interferometer components and spacers is achieved using alignment edges, points, and surfaces. The surface flatness of the components and spacers are only driven by the interferometer performance need, not the optical contacting. Unlike conventional systems, components in the present invention are held together as a group by externally applied compression forces, not adhesives or van der Waals forces. Once the compression forces are applied alignment edges/surfaces/points that do not support the compression can be removed. Still further, the spacers in accordance with the present invention can be made of materials other than the materials of the other optical elements.

The invention combines the ruggedness, self-alignment, and a lightweight of the monolithic design with the flexibility and cost effectiveness of the discrete components design. Accordingly, the main obstacles of the conventional systems can be overcome, which have previously impeded the application of SHS for widespread commercial or military applications, namely the vibration sensitivity and unit cost.

Advantages of the compression assembly of the present invention over discrete components include the compression assembly being more robust and being self-aligned. The specific advantages of the compression assembly of the present invention over an optically contacted, monolithic interferometer include: the surface flatness requirements being relaxed because they are not driven by the optical contacting (i.e., there is a significant cost advantage); the compression assembly being easily disassembled and components therein being easily replaced; and there being no need to manufacture the spacers from the same material as the optical components.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and together with the description, serve to explain the principles of the invention. It is noted that the exemplary embodiment is drawn to iris recognition. In the drawings.

DETAILED DESCRIPTION

Figure 1:
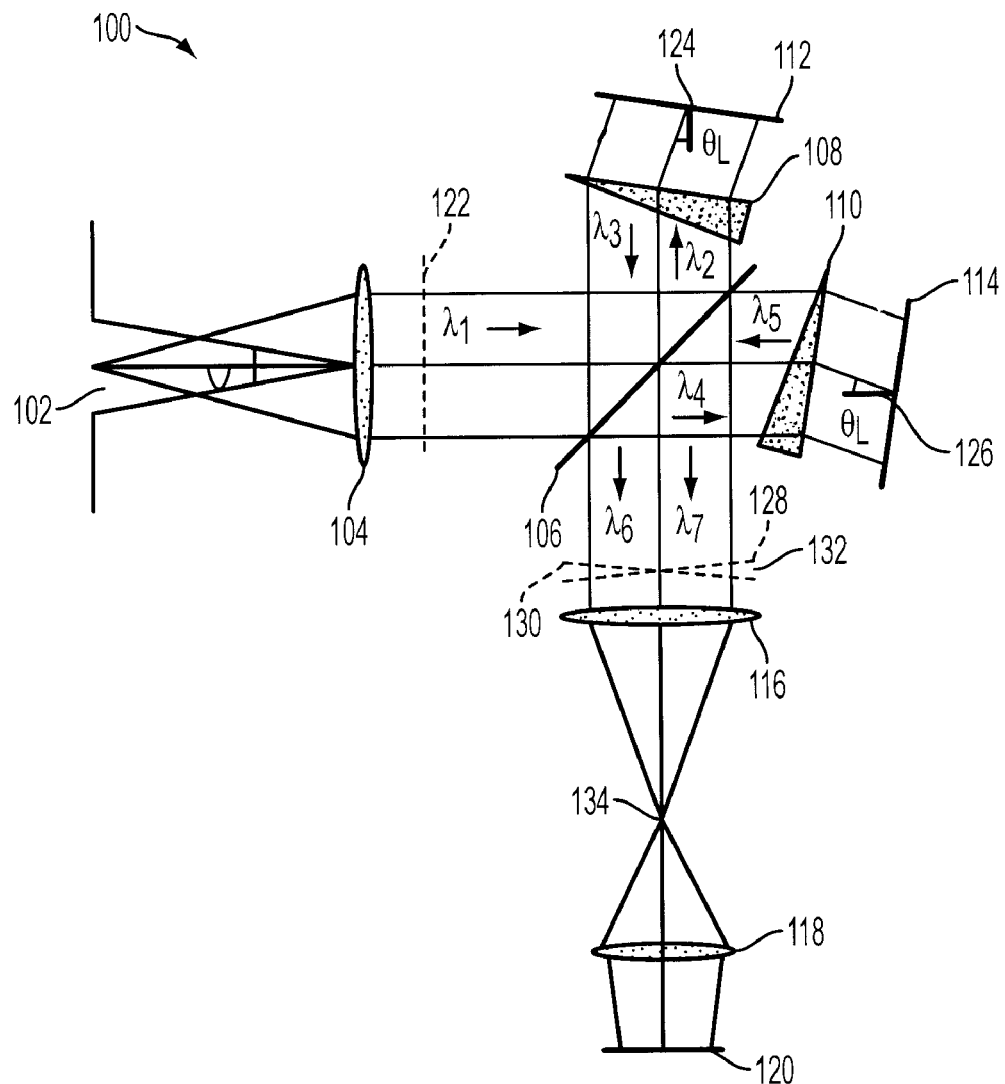
FIG. 1 illustrates a conventional spectrometer having a conventional SHS interferometer comprising discrete optical elements.
Figure 2:
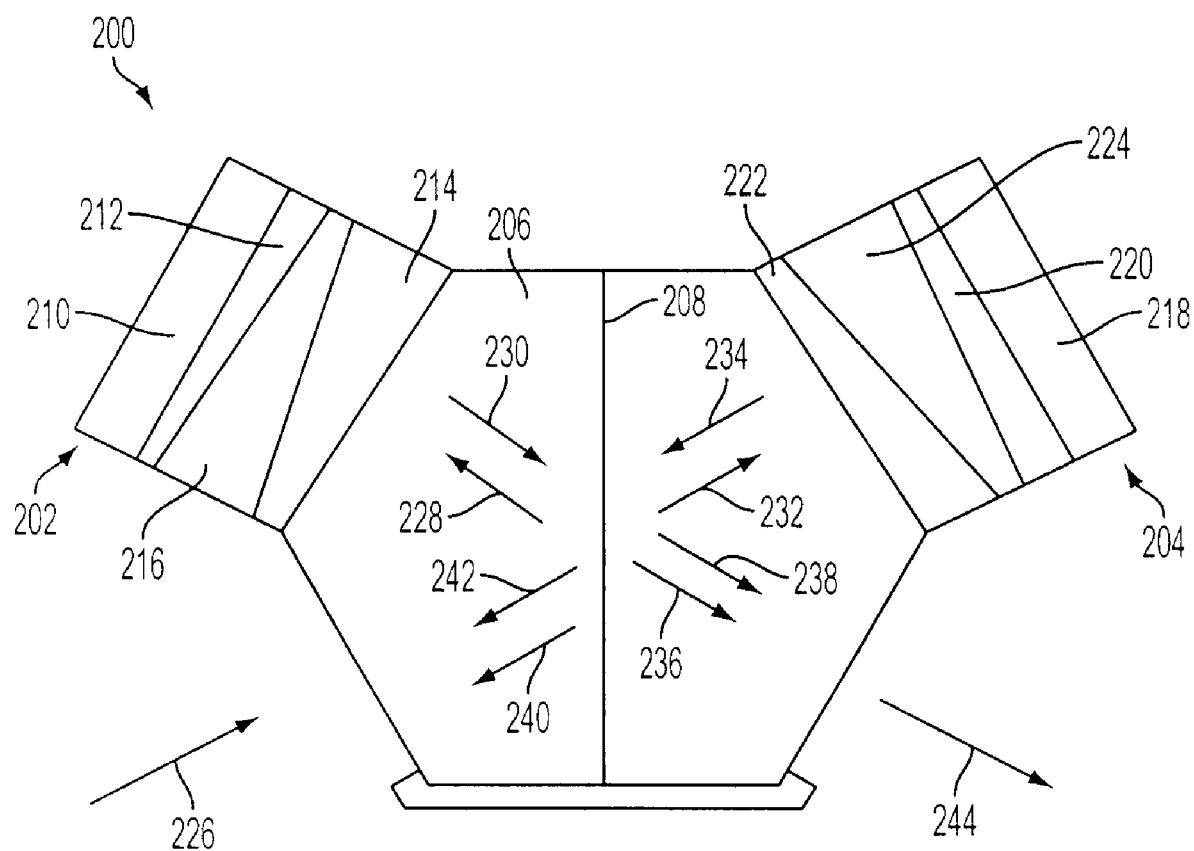
FIG. 2 illustrates a conventional SHS interferometer comprising a monolithic design.
Figure 3:
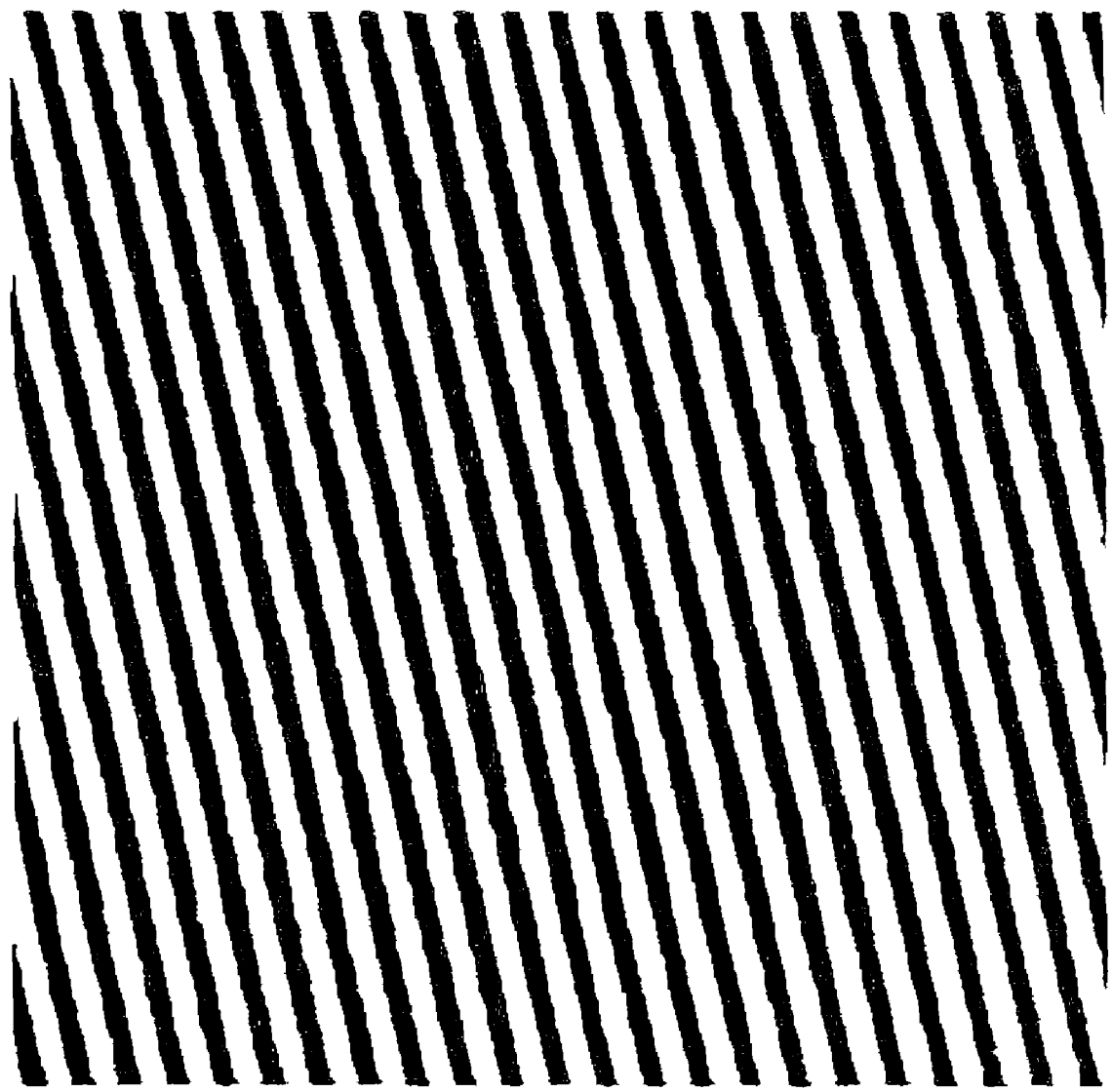
FIG. 3 shows the fringe pattern from a monochromatic source obtained using a conventional spectrometer, having an SHS interferometer comprising a monolithic design.
Figure 4:
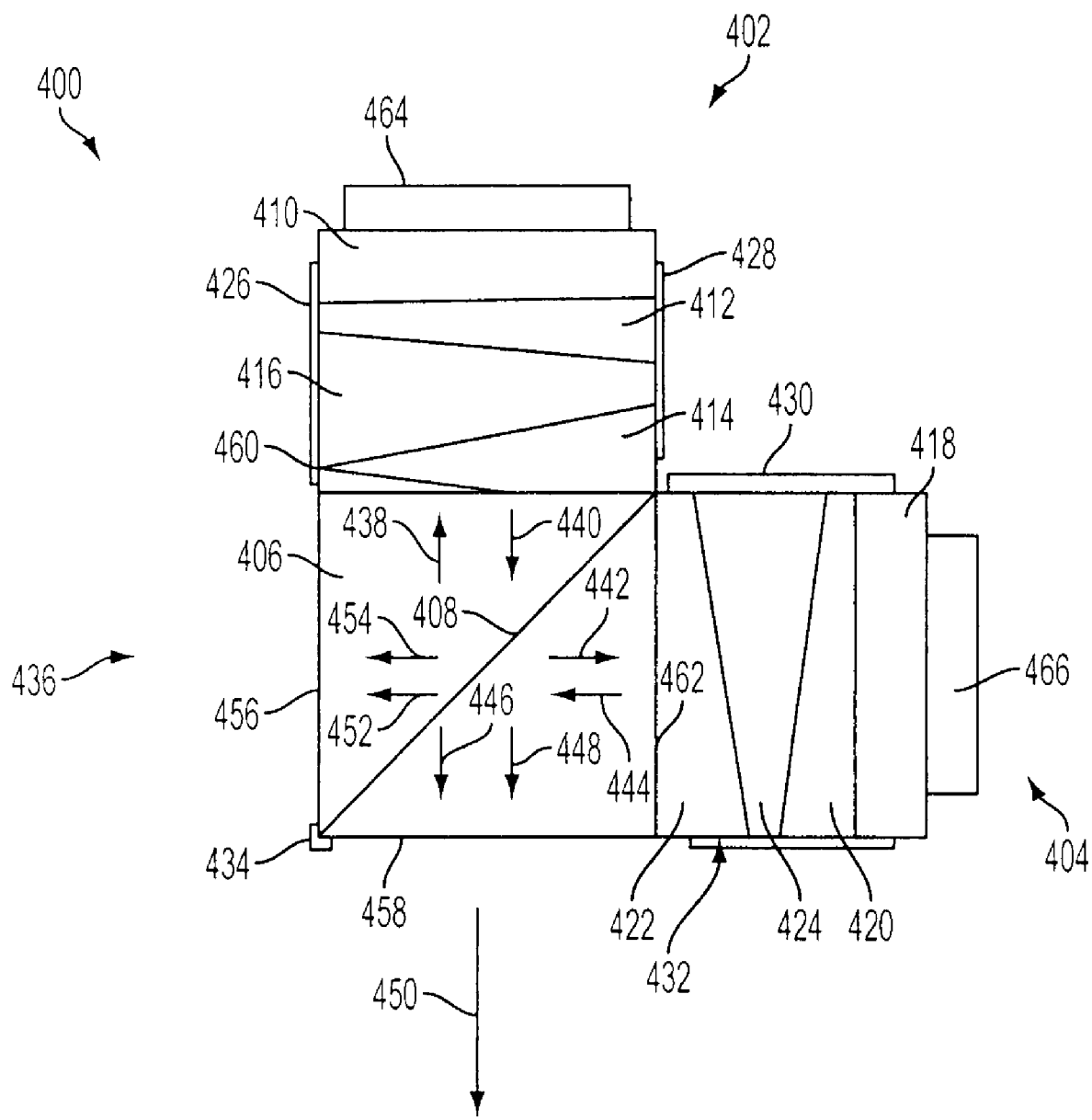
FIG. 4 illustrates a SHS cubic interferometer compression assembly in accordance with an exemplary embodiment of the invention.

FIG. 4 illustrates a cubic interferometer SHS compression assembly for use in a SHS interferometer in accordance with an exemplary embodiment of the invention. As seen in the figure interferometer 400 includes an optical beamsplitter 406, a first leg portion 402, a second leg portion 404, a First retaining portion 464, and a second retaining portion 466. Optical beamsplitter 406 includes an input face 456, an output face 458, a first processing face 460, and a second processing face 462. First leg portion 402 includes a first optical grating 410, a first field-widening prism 416 and a first spacer system. Second leg portion 404 includes a second optical grating 418, a second field-widening prism 424 and a second spacer system. First retaining portion 464 keeps first leg portion 402 in contact with optical beamsplitter 406 at first processing face 460. Second retaining portion 466 keeps the second leg portion 404 in contact with optical beamsplitter 406 at second processing face 462.

In the exemplary embodiment as illustrated in the figure interferometer 400 additionally may include a first leg-restricting portion including items 426 and 428 and a second leg-restricting portion including items 430 and 432. Items 426 and 428 of first leg-restricting portion prevent relative movement between first optical grating 410, first field-widening prism 416 and the first spacer system. The first leg-restricting portion may comprise other devices or mechanisms that prevent relative movement between first optical grating 410, first field-widening prism 416 and the first spacer system, a non-limiting example of which includes a unitary enveloping sleeve. Items 430 and 432 of second leg-restricting portion prevent relative movement between second optical grating 418, second field-widening prism 424 and the second spacer system. The second leg-restricting portion may comprise other devices or mechanisms that prevent relative movement between second optical grating 418, second field-widening prism 424 and the second spacer system, a non-limiting example of which includes a unitary enveloping sleeve.

First retaining portion 464 may comprise a first compression force applicator, and second retaining portion 466 may comprise a second compression force applicator. The compression force may be applied by any known method, non-limiting examples of which include: a spring with reproducible compression force to assure an equal amount of compression force each time an interferometer is assembled; and lapped metal interface surface that avoids isolated pressure or stress points in the optical component. An optional counter force application piece 434 may be included, which provides a counter force against the compression force applied by first retaining portion 464 and the compression force applied by second retaining portion 466. Of course optional counter force application piece 434 may not be included if, for example, beamsplitter 406 is rendered immobile.

In the exemplary embodiment as illustrated in the figure, first spacer system may include a first spacer 412 and a second spacer 414, wherein first spacer 412 is disposed between first optical grating 410 and first field-widening prism 416, and wherein first field-widening prism 416 is disposed between first spacer 412 and second spacer 414. Second spacer system may include a third spacer 420 and a fourth spacer 422, wherein third spacer 420 is disposed between second optical grating 418 and second field-widening prism 424, and wherein second field-widening prism 424 is disposed between third spacer 420 and the fourth spacer 422. Similar to the conventional SHS interferometers as discussed above, field-widening prisms 416 and 424 are optional and are used to compensate for non-paraxial rays within the interferometer to increase the interferometer throughput.

In the exemplary embodiment as illustrated in the figure, optical beamsplitter 406 is a cubic optical beamsplitter, wherein input face 456 is opposite the second processing face 462, and wherein output face 458 is opposite the first processing face 460.

In operation, input light 436 passes into beamsplitter 406 at input face 456 and a portion 450 of input light 436 ultimately exits at output face 458. Specifically, input light 436 is incident upon half mirror 408 and first portion 438 of input light 436 is reflected toward first leg portion 402 and a second portion 442 is transmitted toward second leg portion 404. Portion 438 transmits through prism 416, which is then refracted by an angle toward grating 410. Grating 410 reflects light 440 back through prism 416 and toward beam splitter 406, where the light is partially reflected at half mirror 408, wherein portion 446 is transmitted to output face 458 of beamsplitter 406 and wherein portion 452 is transmitted to input face 456 of beamsplitter 406. Similarly, portion 442 transmits through prism 424, which is then refracted by an angle toward grating 418. Grating 418 reflects light 444 back through prism 424 and toward beam splitter 406, where the light is partially reflected at half mirror 408, wherein portion 448 is reflected to output face 458 of beamsplitter 406 and wherein portion 454 is transmitted to input face 456 of beamsplitter 406. Output 450 is a combination of light portion 446 and light portion 448, which eventually is detected as an interference pattern.

Figure 5:
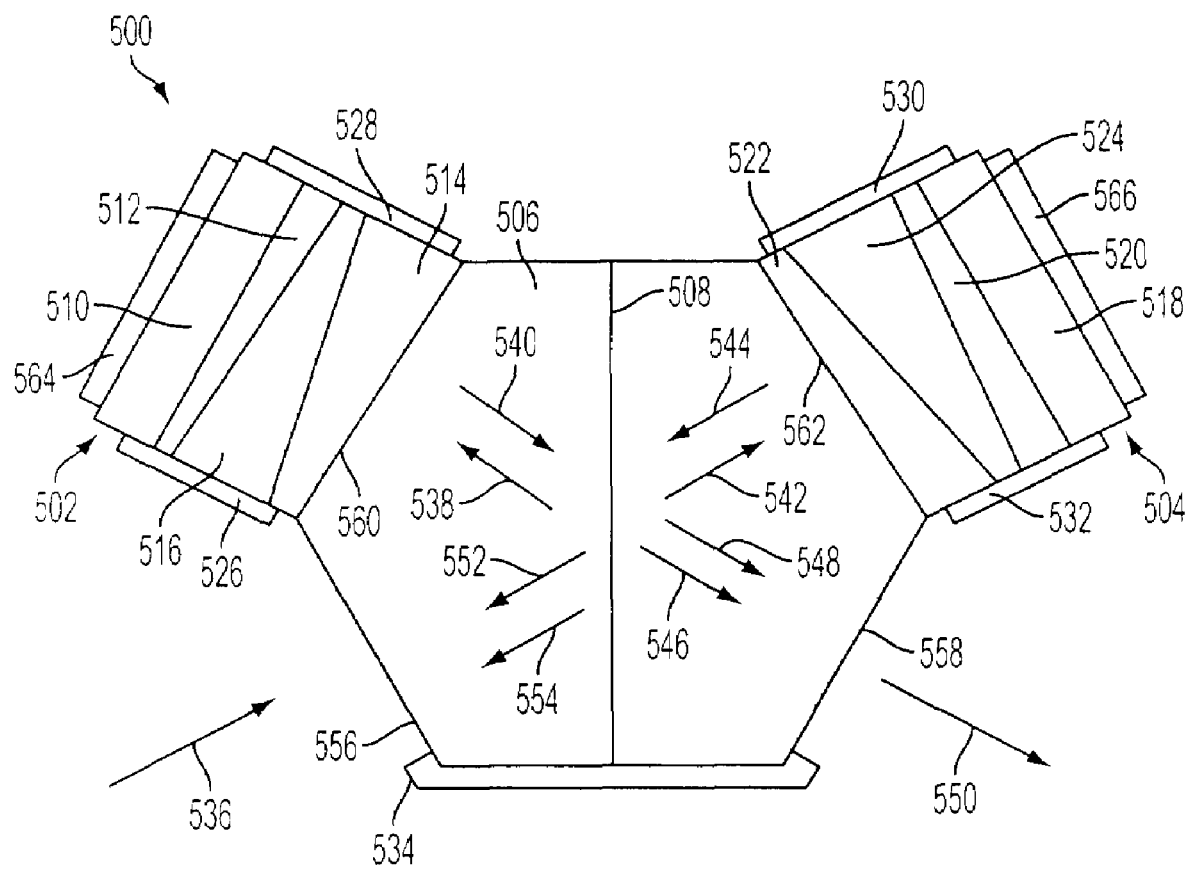
FIG. 5 illustrates a SHS hexagonal interferometer compression assembly in accordance exemplary embodiment of the invention.

FIG. 5 illustrates a hexagonal SHS compression assembly for use in a SHS interferometer in accordance with another exemplary embodiment of the invention. As seen in the figure, interferometer 500 includes an optical beamsplitter 506, a first leg portion 502, a second leg portion 504, a first retaining portion 564, and a second retaining portion 566. Optical beamsplitter 506 includes an input face 556, an output face 558, a first processing face 560, and a second processing face 562. First leg portion 502 includes a first optical grating 510, a first field-widening prism 516 and a first spacer system. Second leg portion 504 includes a second optical grating 518, a second field-widening prism 524 and a second spacer system. First retaining portion 564 keeps first leg portion 502 in contact with optical beamsplitter 506 at first processing face 560. Second retaining portion 566 keeps the second leg portion 504 in contact with optical beamsplitter 506 at second processing face 562.

In the exemplary embodiment as illustrated in the figure, interferometer 500 additionally may include a first leg-restricting portion including items 526 and 528 and a second leg-restricting portion including items 530 and 532. Items 526 and 528 of first leg-restricting portion prevent relative movement between first optical grating 510, first field-widening prism 516 and the first spacer system. The first leg-restricting portion may comprise other devices or mechanisms that prevent relative movement between first optical grating 510, first field-widening prism 516 and the first spacer system, a non-limiting example of which includes a unitary enveloping sleeve. Items 530 and 532 of second leg-restricting portion prevent relative movement between second optical grating 518, second field-widening prism 524 and the second spacer system. The second leg-restricting portion may comprise other devices or mechanisms that prevent relative movement between second optical grating 518, second field-widening prism 524 and the second spacer system, a non-limiting example of which includes a unitary enveloping sleeve.

First retaining portion 564 may comprise a first compression force applicator, and second retaining portion 566 may comprise a second compression force applicator. The compression force may be applied by any known method, non-limiting examples of which include: a spring with reproducible compression force to assure an equal amount of compression force each time an interferometer is assembled; and lapped metal interface surface that avoids isolated pressure or stress points in the optical component. An optional counter force application piece 534 may be included, which provides a counter force against the compression force applied by first retaining portion 564 and the compression force applied by second retaining portion 566. Of course optional counter force application piece 534 may not be included if, for example, beamsplitter 506 is rendered immobile.

In the exemplary embodiment as illustrated in the figure, first spacer system may include a first spacer 512 and a second spacer 514, wherein first spacer 512 is disposed between first optical grating 510 and first field-widening prism 516, and wherein first field-widening prism 516 is disposed between first spacer 512 and second spacer 514. Second spacer system may include a third spacer 520 and a fourth spacer 522, wherein third spacer 520 is disposed between second optical grating 518 and second field-widening prism 524, and wherein second field-widening prism 524 is disposed between third spacer 520 and the fourth spacer 522. Similar to the conventional SHS interferometers as discussed above, field-widening prisms 516 and 524 are optional and are used to increase the interferometer throughput.

In the exemplary embodiment as illustrated in the figure, optical beamsplitter 506 is a hexagonal optical beamsplitter, wherein input face 556 is opposite second processing face 562, and wherein output face 558 is opposite first processing face 560.

In operation, input light 536 passes into beamsplitter 506 at input face 556 and a portion 550 of input light 536 ultimately exits at output face 558. Specifically, input light 536 is incident upon half mirror 508 and first portion 538 of input light 536 is reflected toward first leg portion 502 and a second portion 542 is transmitted toward second leg portion 504. Portion 538 transmits through prism 516, and is then refracted by an angle toward grating 510. Grating 510 reflects light 540 back through prism 516 and toward beam splitter 506, where the light is partially reflected at half mirror 508, wherein portion 546 is transmitted to output face 558 of beamsplitter 506 and wherein portion 552 is reflected to input face 556 of beamsplitter 506. Similarly, portion 542 transmits through prism 524, which is then refracted by an angle toward grating 518. Grating 518 reflects light 544 back through prism 524 and toward beam splitter 506, where the light is partially reflected at half mirror 508, wherein portion 548 is reflected to output face 558 of beamsplitter 506 and wherein portion 554 is transmitted to input face 556 of beamsplitter 506. Output 550 is a combination of light portion 546 and light portion 548, which eventually is detected as an interference pattern.

The present invention, for example as illustrated in FIG. 4 or FIG. 5 provides a way to fabricate rugged SHS interferometers in a faster, more flexible, and much more cost effective way by avoiding optical contacts. Specifically, the retaining portions of the present invention remove the requirement for optical contacts, and therefore significantly relax the surface flatness requirements. The mechanical tolerances for an SHS interferometer in accordance with the present invention are thereby driven by the optical performance only, which yields especially relaxed tolerances for longer wavelengths, e.g. in the infrared. Furthermore, without optical contacts, the present invention provides the option of using different spacer materials in the interferometer. This feature permits more flexibility in the temperature compensation of the interferometer if it is needed and further promotes easy switching of optical components for varying uses. Once the compression forces are applied, alignment edges/surfaces/points that do not support the compression can be removed. Still further, the spacers in accordance with the present invention can be made of materials other than the materials of the other optical elements.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device, comprising:
    an optical beamsplitter having an input face, an output face, a first processing face, and a second processing face;
    a first leg portion having a first optical grating and a first spacer system;
    a second leg portion having a second optical grating and a second spacer system;
    first compression force applicator operable to retain said first leg portion in contact with said optical beamsplitter at said first processing face;
    a second compression force applicator operable to retain said second leg portion in contact with said optical beamsplitter at said second processing face;
    a first leg-restricting portion operable to prevent relative movement between said first optical grating and said first spacer system; and
    a second leg-restricting portion operable to prevent relative movement between said second optical grating and said second spacer system.

2. The device of claim 1, further comprising:
    a first field-widening prism; and
    a second field-widening prism,
    wherein said first spacer system comprises a first spacer and a second spacer,
    wherein said first spacer is disposed between said first optical grating and said first field-widening prism,
    wherein said first field-widening prism is disposed between said first spacer and said second spacer,
    wherein said second spacer system comprises a third spacer and a fourth spacer, wherein said third spacer is disposed between said second optical grating and said second field-widening prism, and wherein said second field-widening prism is disposed between said third spacer and said fourth spacer.

3. The device of claim 2,
wherein said optical beamsplitter comprises a hexagonal optical beamsplitter,
wherein said input face is opposite said second processing face, and
wherein said output face is opposite said first processing face.

4. The device of claim 2,
wherein said optical beamsplitter comprises a cubic optical beamsplitter,
wherein said input face is opposite said second processing face, and
wherein said output face is opposite said first processing face.

* * * * *